United States Patent
Huhtamaki et al.

[11] Patent Number: 5,827,432
[45] Date of Patent: Oct. 27, 1998

[54] METHOD FOR DEWATERING SLUDGES

[75] Inventors: Markku Huhtamaki, Naantali; Markku Lehtokari, Raisio; Jaakko Paatero, Turku, all of Finland

[73] Assignee: Raision Tehhtaat Oy AB, Raisio, Finland

[21] Appl. No.: 793,526
[22] PCT Filed: Aug. 23, 1995
[86] PCT No.: PCT/FI95/00446
    § 371 Date: Feb. 27, 1997
    § 102(e) Date: Feb. 27, 1997
[87] PCT Pub. No.: WO96/06804
    PCT Pub. Date: Mar. 7, 1996
[51] Int. Cl.$^6$ ............... C02F 1/24; C02F 1/36; C02F 1/48
[52] U.S. Cl. ........... 210/705; 210/723; 210/738; 210/748; 210/749; 210/770; 210/243; 204/164
[58] Field of Search ................... 210/243, 607, 210/606, 608, 609, 702, 705, 723, 738, 748, 749, 770; 204/164

[56] References Cited

U.S. PATENT DOCUMENTS

| 4,260,488 | 4/1981 | Condolios . |
| 4,340,488 | 7/1982 | Toth et al. . |

FOREIGN PATENT DOCUMENTS

| 0291 665 | 3/1988 | European Pat. Off. . |
| 1645/74 | 5/1973 | Finland . |
| OFF 2120032 | 11/1971 | Germany . |
| 2750028 C2 | 10/1979 | Germany . |
| 3734281 | 4/1989 | Germany . |
| 58-74199 | 5/1983 | Japan . |
| 60-8000 | 1/1985 | Japan . |
| 1-168400 | 7/1989 | Japan . |
| WO 89/11455 | 11/1989 | WIPO . |

OTHER PUBLICATIONS

Publication of National Board of Waters, Finland; 1992: Forest industry's waste sludges.
Jarvinen, Saunamaki: Forest industry's treatment of sludge in active sludge plants, "Vesitalous" (Water management) issue Jan. 1990.
Report No. 124/1977 of National Board of Waters, Finland: Studies on Conditioning and Mechanical DeWatering of Waste Water Sludge.
Chemical Abstract: 91(14)112076q (Undated).
Chemical Abstract 104(12)94792a 1986.
Chemical Abstract 104(18)155213m 1986.
Chemical Abstract 105(26)231867r 1986.
Chemical Abstract 98(14)113065s Undated.
Chemical Abstract 105(4)2397g Undated.
Chemical Abstract 110(10)81908s Undated.

*Primary Examiner*—David A. Reifsnyder
*Attorney, Agent, or Firm*—Nixon & Vanderhye P.C.

[57] ABSTRACT

Water is recovered from sludge, such as from sewage treatment plants, or wood processing or food processing industries, by either electrically ionizing the sludge or treating the sludge with ultrasound, and then adding coagulant to the sludge to effect coagulation. Prior to or substantially simultaneously with coagulation, the sludge is vigorously mixed, and then the sludge is flocculated and water is mechanically removed from the flocculated sludge. Water removal can be optimized by adding news print pulp, or a tenside, to the sludge just prior to mechanical removal. Free water may also be removed by filtering just prior to mechanical removal, and mechanical removal can take place in two consecutive stages, first a low pressure (1–5 bar) stage to produce a cake, and then the cake is broken up and subjected to a high pressure (5–60 bar) stage.

20 Claims, 7 Drawing Sheets

METHOD FOR DEWATERING SLUDGES

BACKGROUND AND SUMMARY OF THE INVENTION

The present invention relates to a method for removing water from sludges, such as sludges from community sewage treatment plants, sludges of the wood-processing and food manufacturing industries or the like biosludges, the method comprising the following subsequent steps:

(a) coagulating, whereby coagulant is added to the sludge so as to coagulate the dissolved substances therein, i.e. transform them into particulate solid matter;

(b) flocculating so as to form agglomerates of solid matter, i.e. flocs of the particulate solid matter in the sludge; and (c) removing water mechanically from the sludge by pressing, e.g. by means of a belt filter, a screw press or by centrifuging.

When treating waste waters various sludges are produced which can, mechanically concentrated, be used as such, be composted, be used for soil improvement or be combusted directly or after drying.

In Finland, at the end the 1980, 50% of the sludges from community sewage treatment plants was spread over fields, 25% was used for building of parks and gardens and 25% was transported to dumps. Of the sludges of the wood processing industry only approximately half of it was effectively used (combusted) and the other half went to dump tips. The total amount of the sludges from the communities and the wood processing industry is nearly 0.6 million tons sludge calculated as dry matter.

To deposit sludges as such at dumping areas causes big transport and dumping cost, due to the space needed and the hazardous effluents to the water system along with the runoff and seepage waters. In Germany, for instance, regulations are being drafted, according to which only the ash which is produced when sludges are combusted is allowed to be transported to the dumps. As the environmental regulations are made stricter, the use of sludges as such on the fields will decrease everywhere from what it is now. The regulations being drafted in the Netherlands will totally put an end to the use of sludge on cultivated lands in 1996.

The trend in Europe seems to be that the combustion of sludges is becoming more common. The ash material produced by the combustion is tipped at dumping areas. By the present-day dewatering methods, however, the dry matter content of the sludge, 15–30% for instance with the sludge qualities of the community sewage treatment plants and the industrial biosludges, is so low that auxiliary fuel, such as oil, gas or peat, is needed in the combustion. A trouble-free combustion of sludge without any additional fuel requires, depending on the ash content, a dry matter content level of 40–50%, which is difficult to reach with most sludges by mechanical methods only.

Regardless of the final placement of the sludges, a higher dry matter content than that of today will be required in the future. At the present, even when for instance composting sludges, additives have to be used. The amount of additives can be reduced or they can be completely omitted, if the sludge can be dewatered to a dry matter content of 35–40%.

By using higher pressures, the sludge could be pressed to a higher dry matter content. A factor setting limits to the increase of the pressure is, however, in many cases the low compression strength of the sludge, i.e. that the sludge is not dewatered but disintegrates and goes directly through the pressing wires when the pressure is increased. Some sludge passes through the wires even at pressures as low as 1 bar, whereas the flocs in other sludges are more resistant against pressure. The strength or resistance of the flocs is an essential factor when sludges are dewatered by pressing.

Addition of various chemicals improves the strength of the flocs. It is, however, necessary to establish a good contact between the chemicals and the solids in the sludge in order to achieve the desired effect. The layer of water which is firmly bound to the surface of the solid particles hampers the formation of tight and strong flocs. Removal of this layer of water in the coagulation stage would make it possible to produce a tighter and stronger floc structure.

The quality and the water retention properties of the sludges vary greatly, even at the same plant and often even daily. The following factors, inter alia, have an influence on the water retention properties of the sludges: the quality of the purified waste water, the design, structure and apparatuses of the waste water treatment process, the chemicals used in the waste water treatment process, the possible pretreatment of the sludge and the age of the sludge. The higher standards set for the purification of the waste waters would in the future seem to result in sludges which are still more difficult to dewater than the sludges of today. As regards the wood processing industry sludges, the more careful recovery of the fibres, the increasing use of recycled fibre pulp and the growth of the quantity of the biosludges have a similar effect.

It is an object of the present invention to solve the above problems by the provision of an improved method of dewatering sludges.

It is a particular object of the invention to provide a method which makes it possible to dewater sludges mechanically to a high dry matter content better than previously, for instance by pressing at a high pressure.

It is a further object of the invention to provide a method for dewatering sludges, which can be adjusted according to the type of sludge and the dewatering properties of the sludge.

Thus, the object is to provide an improved method for dewatering biosludges so that the sludge will by using less auxiliary substances or additives be adapted for composting, depositing at a dumping area or combusting.

In order to achieve the above mentioned objectives, the invention is characterized by the features defined in the appended claims.

According to a preferred embodiment of the invention, the sludge is treated in a pretreatment step, before or simultaneously with the addition of the coagulant, by physical or physical-chemical means, by vigorously mixing it and electrically ionizing it or treating it with ultrasound or by combining these treatments in order to improve the preconditions for the coagulation reactions in the sludge. A suitable pretreatment is chosen dependent on the sludge or the water-solids mixture in question.

The energetic and structural binding of the water to the solid matter in the sludge is, according to the invention, gradually broken down by physical-chemical means, starting from the low-energetic and weak-structural binding state of the water and proceeding in stages towards the state in which the water is energetically and structurally more strongly bound to the solids.

The structure of the water and its binding to the solids is according to the invention disturbed by physical means, thus creating preconditions for the coagulation reactions for bringing the dissolved substances into particulate solid form and for separating water from the solid matter. Good preconditions for the coagulation reactions are brought about by removing the bulk water, the water bound by hydrogen or other weak bindings around the solids, whereby the added coagulant gets into intimate contact directly with the solids.

The coagulation reaction is carried out immediately after the physical treatment(s) or simultaneously with them by adding to the sludge mainly inorganic precipitation chemicals, i.e. coagulants, known per se, such as aluminium compounds, iron compounds, such as ferric sulphate or the like. The coagulant is added to the sludge, according to a preferred embodiment of the invention, while mixing the sludge vigorously at the same time, for instance for about 15 s–1 min.

According to another preferred embodiment, the sludge is ionized in a pretreatment step prior to adding the coagulant or possibly in a later step about 15 s–2 min by an apparatus producing a high voltage electrostatic field. An electrostatic field of 5000–10000 V, for instance, is maintained by the ionization. Preferably, the coagulant is added to the sludge while mixing at the same time. Thus, the pretreatment step for the sludge comprises:

ionization of the sludge, and addition to the sludge of an inorganic coagulant, such as an aluminium compound, an acid or ferric sulphate, at the same time mixing the sludge vigorously so as to produce agglomerates of solid matter, in this or the reverse order.

After the coagulation step, the sludge is preferably allowed to settle prior to the flocculation step before the flocculant is added. The flocculant is added to the sludge while mixing gently. As flocculants can be used for instance various cationic and anionic polymers, i.e. polyelectrolytes, lime milk, ferric sulphate or other such chemical which enables the produced flocs to endure even relatively rough further treatment.

A fairly cationic, long-chain polymer is usually suited for the sludges from community sewage treatment plants. A weakly cationic, long-chain polymer is suited for the wood processing industry sludges. The amount of polymer to be added varies, depending on the sludge, from 1 to 10 kg polymer per ton of dry matter in the sludge. Also the demand of coagulant varies depending on the sludge.

The free water released into the sludge in the pretreatment steps is usually removed after the flocculation, for instance by filtering using only a small pressure difference. The free water can of course be removed in some other way known per se. An amount of free water varying between 45 and 80% depending on the sludge can easily be removed from a well flocculated sludge prior to the pressing. The removal of the free water prior to the mechanical dewatering increases the efficiency of the removal of the remaining water in the mechanical dewatering, shortens the pressing time needed and makes it possible to accelerate the rise of pressure. In some applications, separate removal of the free water may not be necessary.

It is important that the water can flow out from the cake in the pressing step. By adding fibre into the sludge before the pressing, a distinct improvement of the pressing result can be brought about in many cases. It is not advisable to try by force to press out the water bound to the solids by means of rough treatment, but good conditions for the removal of the water should be established, i.e. to create good flocs and exhaust passages for the water. The fibre provides structure to the solid matter and forms channels in the sludge, i.e. "drainage pipes", which facilitates the discharge of water from the sludge.

The fibre added to the sludge can be mechanically or chemically treated fibre, hydrophobic, hydrophile or neutral fibre. Suitable fibre can be obtained from newsprint pulp, waste paper pulp or other recycled fibre pulp, peat, bark or other corresponding fibrous material.

Addition of fibre renders it possible to compress the sludge even to thick cakes without the cake disintegrating, which means that the capacity of the press can be increased. The optimal amount of fibre needed depends mainly on the thickness of the sludge cake to be pressed. With a thin cake (1–2 kg/d.w./m$^2$), an addition of 10% fibre (percentage of dry content of sludge) is optimal, while with a slightly thicker cake (3–4 kg/d.w./m$^2$), an addition of 20% fibre gives the best result. With a thin sludge cake, the addition of fibre does not always provide a significant improvement of the result of the pressing, while with a thick sludge cake it does.

The effect of the fibre can be increased by a small addition of a tenside or some other chemical immediately before the pressing. The tenside adheres to the solid matter making it "slippery" and preventing the water from adhering again to the solids.

In the mechanical dewatering step, the sludge is pressed at a pressure of 1–60 bar. It has been found out that in most cases it is advantageous to carry out the mechanical dewatering in stages in at least two separate, subsequent pressing steps:

a low pressure step, in which water is pressed out from the sludge at a pressure of 1–10 bar, preferably 1–5 bar, and subsequent to the low pressure step a high pressure step, in which water is pressed out from the sludge at a pressure of 5–60 bar, preferably at about 10 bar. The pressure step is carried out with for instance a filter belt press or a screw press, by pressing or centrifuging.

An increase of the pressing pressure increases the dry matter content of the produced cake. The strength of the floc, which can be influenced by the pretreatment according to the invention, determines together with the efficiency of the predewatering which rate of rise of the pressure can be used.

The rate of rise of the pressure is of importance when it is desired to compensate a reduced total pressing time by an increased rate of rise of the pressure. In conventional dewatering, the dry matter content decreases when the pressing time is shortened. By means of the pretreatment according to the invention, flocs can be produced that endure a faster rise of the pressure, whereby the same dry matter content as in a conventional sludge treatment without an efficient pretreatment can be achieved with shorter pressing time.

The sludge cake formed of the partially dewatered sludge in the low pressure step can according to a preferred embodiment of the invention be broken down, disintegrated or in a corresponding manner treated before the final pressing of the sludge cake in the high pressure step. The sludge cake can for instance be broken mechanically by modifying the design of the wire so that the wire web is divided in two parts. The breaking of the sludge cake, i.e. the disintegration of its structure, has proved to have a positive effect on the final dewatering of the sludge cake. The dry matter content of the sludge cake can by this procedure be increased by as much as 1–2%.

The remaining mechanically bound water in the sludge can more efficiently be removed in the high pressure pressing from a precompressed and broken cake of solid matter than from uncompressed sludge. By dividing the pressing into stages, a shorter treatment time, a thicker sludge cake and a higher dry matter content can be achieved than by conventional methods.

The pressing step can, if desired, be combined with a heating step in which the sludge cake is heated, for instance by means of heat rolls. The water removal in the pressing step can alternatively be intensified by means of suction rolls or the like. The solid matter which has been concentrated by pressing is dried to a final dry matter content, for instance by means of a modulated belt drier.

DETAILED DESCRIPTION OF THE DRAWINGS

Figure 1:
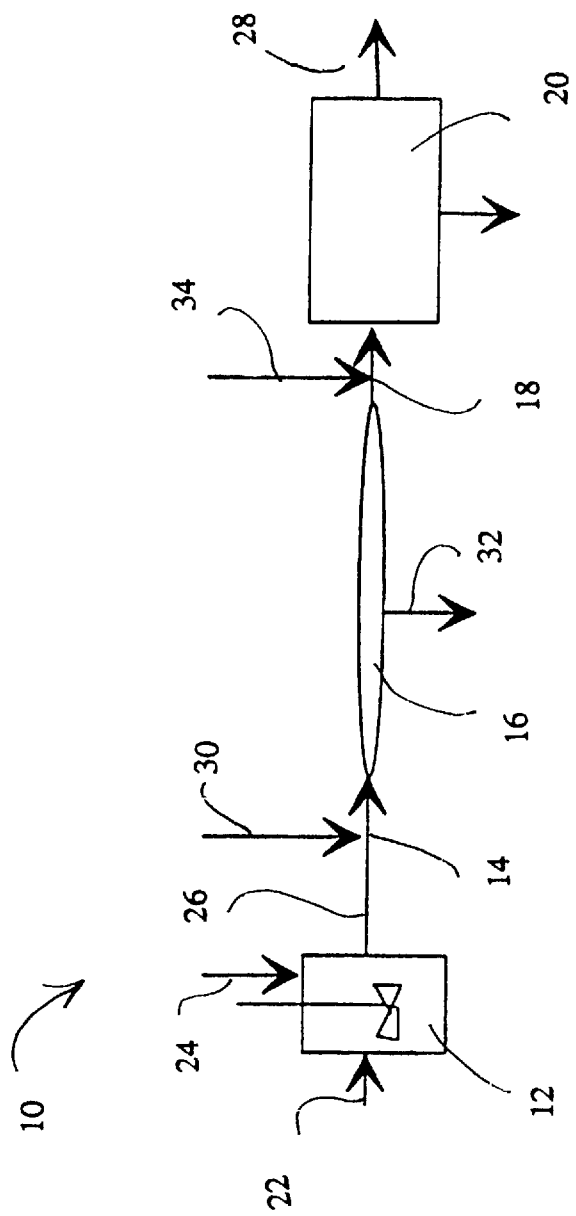
FIG. 1 is schematical illustration of a sludge dewatering system based on the method of the invention.

FIG. 1 shows schematically a dewatering system 10 which consists of the following steps: a coagulation step 12, a flocculation step 14, a free water discharge step 16, a fibre addition step 18 and a pressing step 20 for the pretreated sludge.

The sludge 22 to be dewatered is conducted to the coagulation step 12, where coagulant 24 is added to the sludge while mixing the sludge vigorously at the same time. Between 26 the coagulation step 12 and the subsequent flocculation step 14, the sludge is allowed to settle, whereafter a polymer 30 promoting the flocculation is added in the flocculation step 16, at the same time mixing the sludge lightly. After the flocculation step, free water 32 is removed in the free water discharge step 16, for instance by filtering through a wire. Usually 45–80% of the free water can be removed.

Removal of the free water prior to the pressing shortens the required pressing time and renders it possible to use a higher dry matter load in the pressing step without the quality of the filtrate water significantly impairing. After the removal of free water, fibre 34 can be added to the sludge in the fibre addition step 18 so as to form water discharge passages in the sludge for the pressing step.

In the pressing step 20, the sludge is pressed at a pressure of >5 bar, preferably at a pressure of >10 bar, depending on the sludge and its pretreatment.

Dewatering test I

In the system shown in FIG. 1, 2000 g of digested community sludge, which contained 76 g dry matter, was dewatered. 100 g of coagulant (Kempac) was added to the sludge while mixing the sludge vigorously at the same time for about 30 seconds. 220 g of flocculant was added. 1582 g of free water containing about 1.5 g dry matter was removed in the free water discharge step, whereafter 5 g of fibre was added to the sludge prior to pressing. The pressing was carried out at a pressure of 10 bar for 10 minutes, whereby 546 g of water was removed (containing about 0.5 g of dry matter). The result was a sludge cake having a weight of 160 g, containing 79 g of dry matter and 81 g of water, i.e. the dry matter content was about 49%.

When the above test was carried out with the same sludge without mixing vigorously for 30 seconds and without an addition of 5 g of fibre, a dry matter content of 36% of the sludge was obtained. By a pretreatment in which the sludge was mixed vigorously for 30 seconds, but without an addition of fibre to the sludge, a dry matter content of the sludge of about 37% was obtained. The dewatering test I thus shows that vigorous mixing in connection with the addition of the coagulant and an addition of fibre improves the dewatering.

Figure 2:
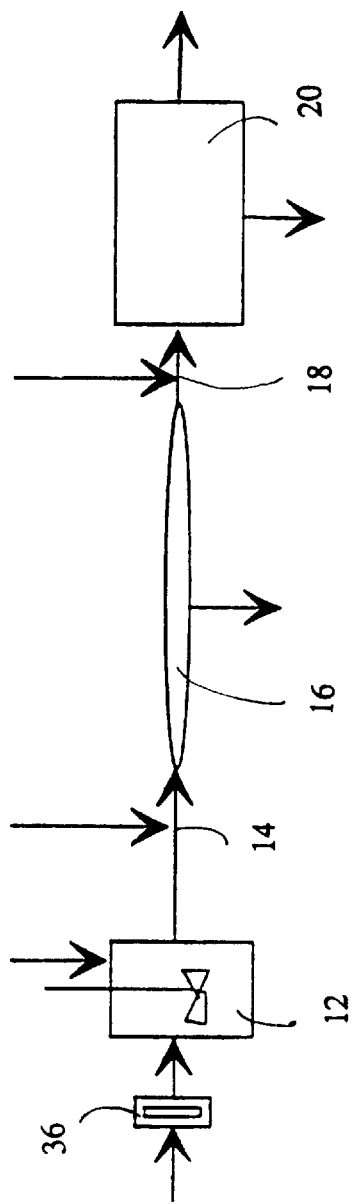
FIGS. 2–4 are schematical illustrations of three other dewatering systems based on the method of the invention.

FIG. 2 shows the dewatering system of FIG. 1, in which the sludge is pretreated in an ionization step 36 prior to the addition of the coagulant. The ionization influences physically the water layers surrounding the particles of solid matter interfering with them and disintegrating them. The ionization makes it possible for the coagulant to get close to the particles of solid matter and to adhere to them so as to form aggregates of particles.

Dewatering test II

In the system shown in FIG. 2, 2000 g of sludge, the original dry matter content of which was 3.37%, was dewatered. The sludge was pretreated by ionizing it for 30 seconds prior to mixing coagulant into the sludge. 100 g of coagulant (Kempac) was mixed into the sludge conventionally (without a vigorous pretreatment mixing). 200 g of flocculant and 5 g fibre was added to the sludge. The result after the pressing (5 bar, 10 min) was a sludge cake having a dry matter content of 42.31%. By increasing the ionization time to 1 minute, a dry matter content of 42.98 was obtained. By ionizing the sludge, a dry matter content of above 40% can thus be achieved.

Dewatering test III

In the system shown in FIG. 2, in which the ionization step 36 was substituted by an ultrasound treatment, step 36' 2000 g of sludge having a dry matter content of 3.7% was dewatered. The amount of coagulant and flocculate added was the same as in the previous test. Fibre was not added to the sludge. The sludge was pretreated for 30 seconds by ultrasound. Finally the sludge was pressed at a pressure of 10 bar for 10 minutes, whereby a dry matter content of 37.80% was reached. When the ultrasound treatment was extended to 2 minutes, a dry matter content of 38.96% was obtained. By adding a twofold amount of coagulant, a dry matter content of 41,29% was reached, although the initial dry matter content of the sludge was lower (2.75%) in this test than in the previous one.

Figure 3:
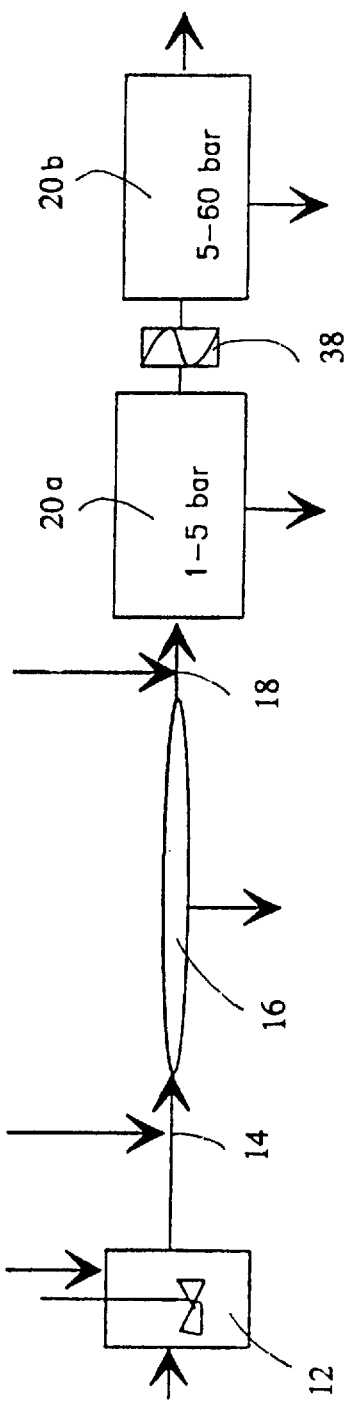

FIG. 3 shows the dewatering system of FIG. 1, in which there is a coagulation step 12, where the sludge is vigorously mixed as the coagulant is added. After the flocculation step 14, free water is removed in the free water discharge step 16. The pressing step 20 is divided in two separate parts: a low pressure pressing step 20a in which the sludge is pressed at a pressure of about 1–5 to a dry matter content of 15–20%, and a high pressure pressing step 20b in which the sludge is further pressed at a pressure of 5–60 bar.

A disintegration step 38 is arranged between the pressing steps. When the sludge cake formed in the low pressure step is disintegrated, the solid matter therein will be reoriented, which improves the removal of water from the sludge cake in the high pressure pressing states. The dry matter content of many sludges can in this way be raised by about 1–1.5 percentage units.

Figure 4:
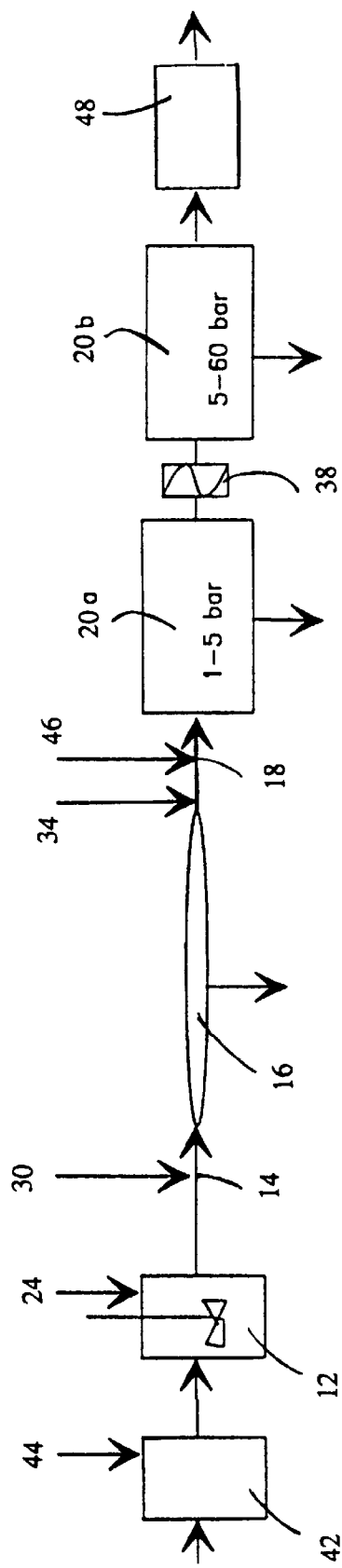

FIG. 4 shows a dewatering system similar to that of FIG. 3, which in addition to the pretreatment steps shown in FIG. 3 comprises a pretreatment step 42 with a long term effect, in which enzyme 44 is added to the sludge so as to break down the structure of the harmful matters which there are in the sludge or which are produced. Addition of enzyme thus renders formation of durable flocs possible. It has been found that the enzyme pretreatment is able to raise the dry matter content of the sludge by a few (0.6–4.3) percentage units, especially in sludges which are difficult to treat. The use of enzymes requires generally some treatment time (about 10 minutes or more) and often a temperature of 30–40° C. The use of enzymes is particularly suitable for sludges which are difficult to dewater. The treatment times and the temperatures required depend, of course, on the enzyme which is used in each case.

In the system shown in FIG. 4, polymer 46, which has been found to raise the dry matter content of most sludges, is added to the sludge, in addition to fibre 34, after the free water discharge step 16.

In the system shown in FIG. 4, the sludge cake is further dried by thermal drying 48 after the high pressure pressing step 20b, whereby a very dry, easily transportable, storable and combustible dry solid matter is obtained.

By pretreating the sludge to be dewatered in stages and selectively, according to the invention, by a treatment suitable for the sludge in question, the final dry matter content of the sludge can be raised to a higher level before the drying, combustion or composting than by conventional dewatering methods.

Figure 5:
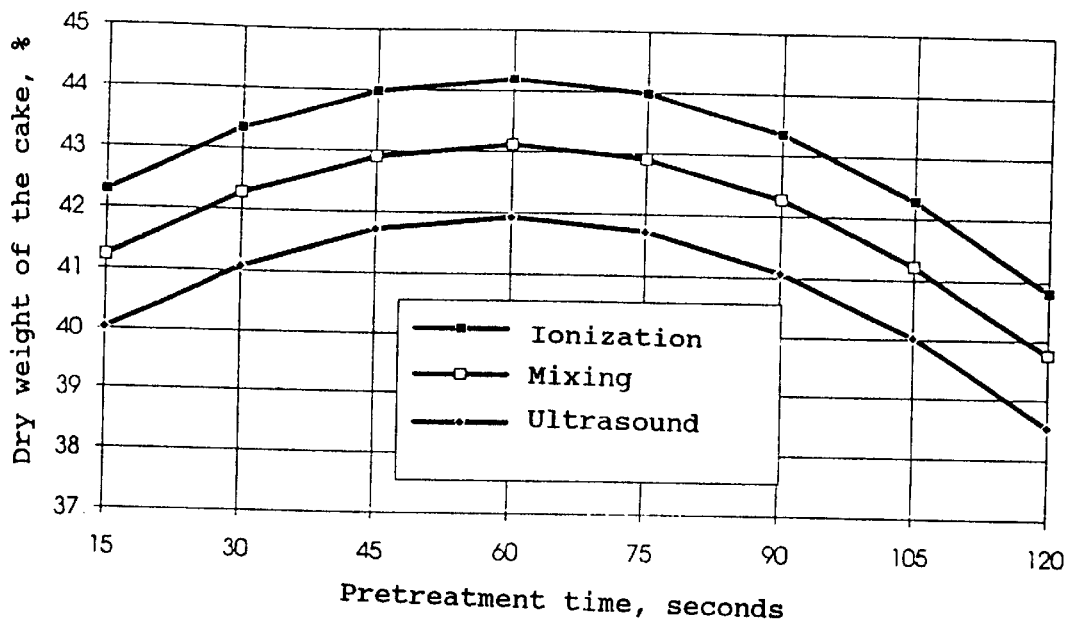
FIG. 5 is a diagram in which the dry matter content of the sludge cake achieved by means of various pretreatment steps of different lengths are compared.

In the diagram illustrated in FIG. 5, there is shown the effect of various treatment steps, i.e. ionization, mixing and ultrasound treatments of different lengths on the dry matter content of the final product. Vigorous mixing as well as ionization and ultrasound treatment improve the water removal in connection with the addition of a coagulant. According to the test results, the ionization seems to have the best effect on the dry matter content. The optimal treatment time was 60 seconds for all three pretreatments. The ultrasound treatment requires, however, often more coagulant than the other treatments.

Figure 6:
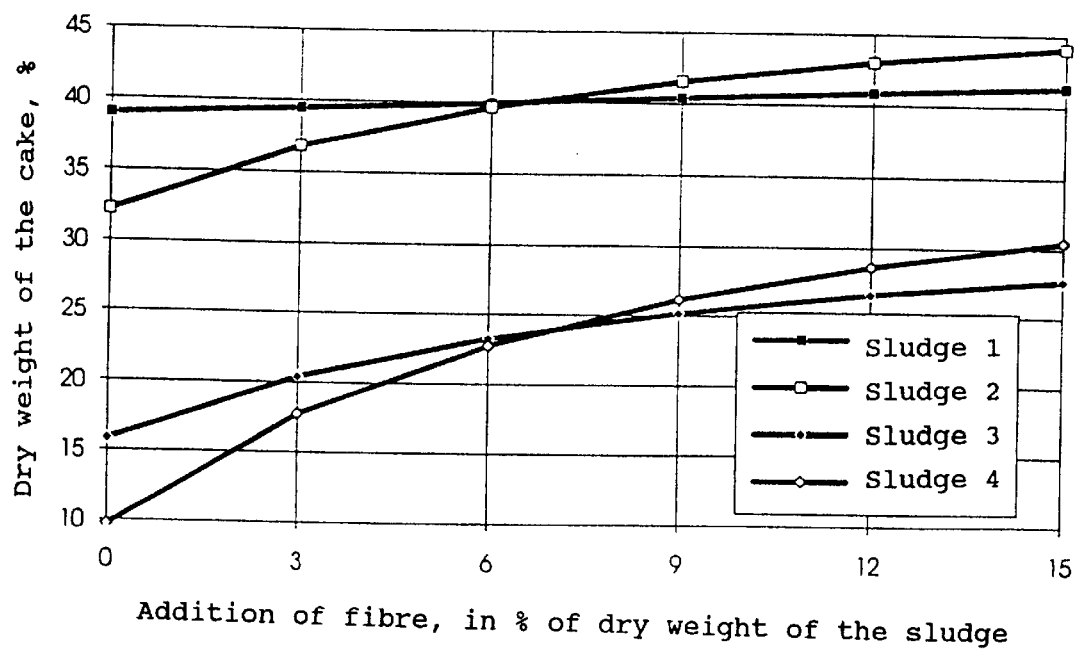
FIG. 6 is a diagram which shows the correlation between the dry matter content of various sludge cakes and the amount of added fibre.

FIG. 6 shows the effect of the adding of fibre on the dry matter content of the sludge cake when the method of the invention is being applied. The addition of fibre seems to have a marked effect on the dry matter content of the cake, often in the order of 10%, up to an addition of fibre of 15%, after which the dry matter content does not seem to rise significantly anymore. The effect of the added fibre is deducted from the above mentioned dry matter contents of the sludge.

It can be stated that the various pretreatments separately and in particular when interacting are of great importance in the dewatering of sludges.

It has, however, also been shown that the quality of the sludge has a significant effect on its dewatering properties and thereby determines which pretreatment step is the most advantageous and which additions of chemicals are required in order to achieve a good processability and final result. The fibre content of the wet sludge, for instance, has a significant effect on the dewaterability. A sludge containing only a small amount of fibre endures pressure poorly and will easily be packed against the wire thereby forming a layer impervious to water. The waste waters from a paper mill contain often as such a sufficient amount of fibre. Community sludges do not contain enough fibre and in general require addition of fibre and removal of free water prior to the pressing and do not easily allow formation of a thick sludge cake. By the pretreatment according to the invention a notable improvement of the processability of the sludges can be obtained.

The required information about the quality of sludge and its processability can be obtained by small-scale tests. A suitable pretreatment is chosen for each sludge in question and the proper amount of coagulant and/or fibre and possibly a further chemical, such as enzyme or tenside, which should be added is determined by means of the tests.

The staged dewatering system according to the invention and the treatment of the sludge according to the module principle, in which each module can be taken into use when needed and in which by means of the staged treatment the special features of each sludge can better than in the conventional methods be taken into consideration, have been found to improve the treatment of biosludges in particular, which are difficult to dewater. It is thus possible to achieve substantially higher dry matter contents of the sludge than previously by means of the method according to the invention.

Figure 7:
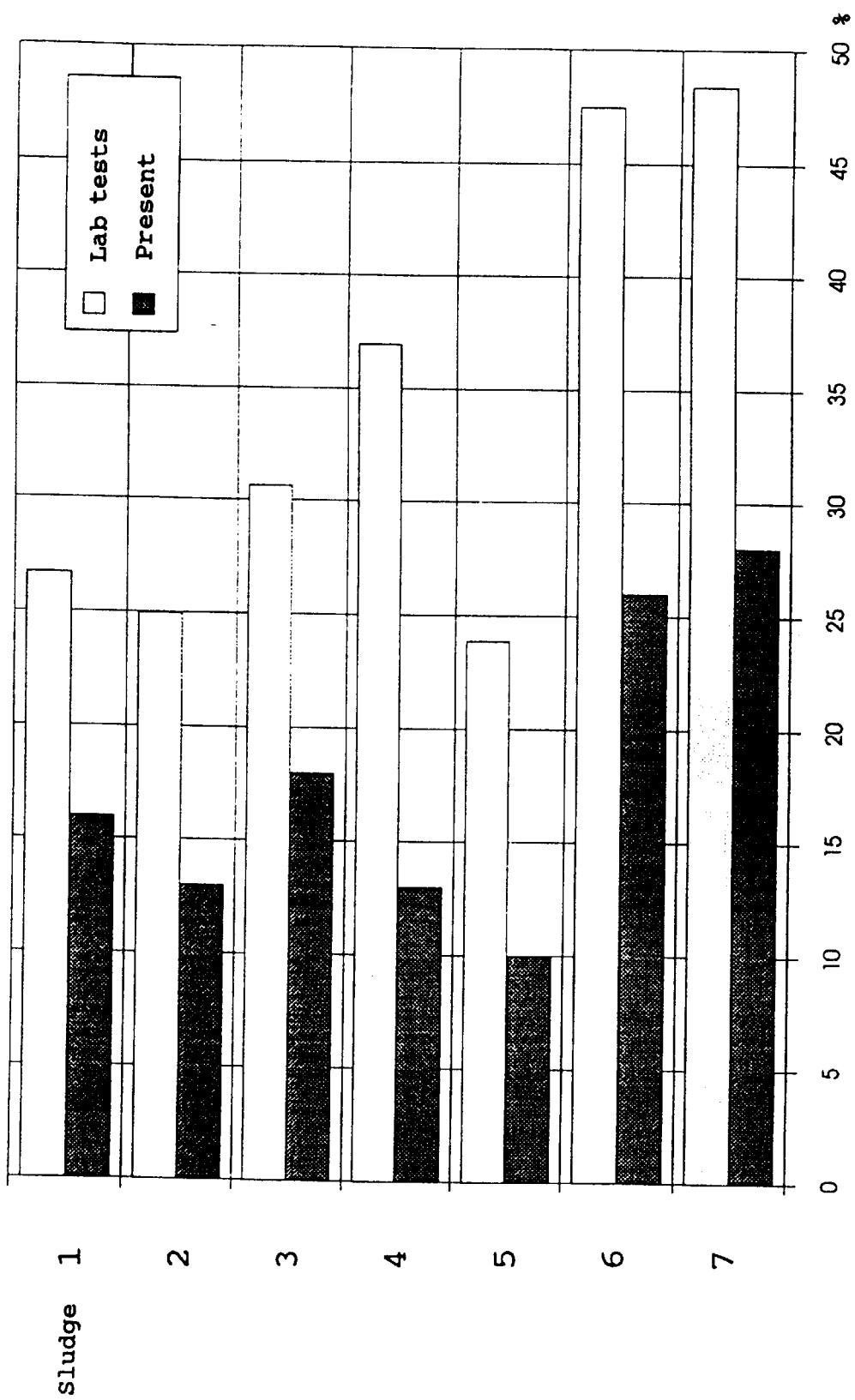
FIG. 7 shows a comparison of the dry matter content of the sludge cake achieved by conventional dewatering methods and the method according to the invention.
Figure 8:
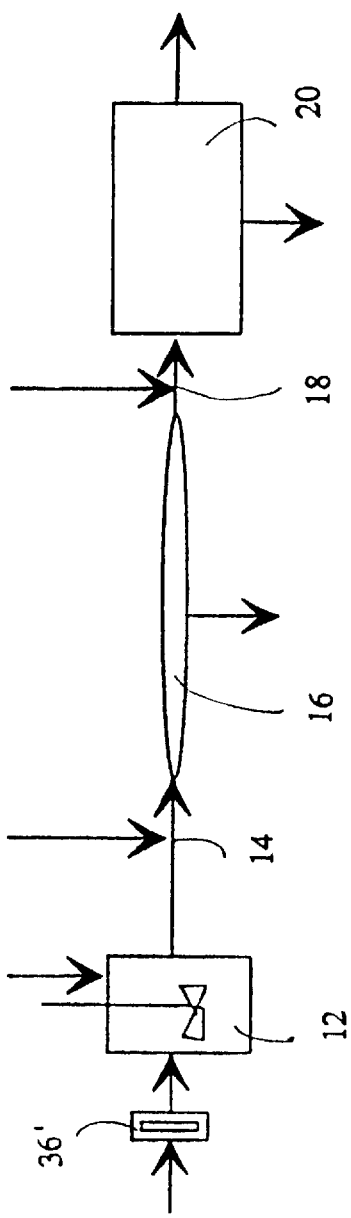
FIG. 8 shows a schematical illustration of a dewatering system based on the method of the invention and including an ultrasound treatment step.

FIG. 7 shows the dry matter contents of seven different sludges obtained when dewatering by the method being used at present on the one hand, and when dewatering after the intense pretreatment steps in a laboratory on the other hand. All sludges have reacted favourably to the pretreatment. Sludges 1 and 3 are community sludges, sludges 2 and 4 are food industry sludges, sludge 5 a mixture of a community sludge and a food industry sludge, sludge 6 a digested community sludge and sludge 7 a paper industry sludge.

The invention is not limited to the embodiments described and illustrated above, but can be varied in many ways within the scope and spirit of the invention, which is defined in the appended claims. Thus, for instance an ionization step or an ultrasound treatment can be arranged to take place before the coagulation step or the flocculation step, or even immediately before the water removal. Different pretreatment steps can be applied separately or together, depending on the sludge to be dewatered, the desired final result and the available treatment facilities. The same pretreatment step can, if desired, be arranged to take place several times in the same dewatering process.

We claim:

1. A method of recovering water from sludge containing dissolved substances, comprising:

(a) electrically ionizing the sludge; then after (a)

(b) adding coagulant to the sludge to effect coagulation of dissolved substances therein;

(c) prior to or substantially simultaneously with (b), vigorously mixing the sludge to activate water bound to the sludge and to make the coagulant more effective; then after (b) and (c)

(d) flocculating the sludge to form flocs of solid matter; and (e) mechanically removing water from the flocculated sludge.

2. A method as recited in claim 1 wherein (a)–(e) are practiced using sludge selected from sewage treatment plant sludge, wood-processing sludge, and food-processing sludge.

3. A method as recited in claim 2 wherein (b) is practiced by adding an aluminum compound, an acid, an iron compound, or mixtures thereof, as an inorganic coagulant.

4. A method as recited in claim 2 wherein after (b) and (c), and before (d), the method further comprises allowing the sludge to settle.

5. A method as recited in claim 2 wherein (e) is practiced in at least two different stages, comprising: pressing the sludge at a pressure of 1–5 bar in a low pressure stage to produce a sludge cake; breaking down the sludge cake; and then pressing the sludge at a pressure of 5–60 bar in a high pressure stage.

6. A method as recited in claim 1 wherein (c) is practiced substantially simultaneously with (b).

7. A method as recited in claim 6 wherein (c) is practiced for about 15 seconds–1 minute.

8. A method as recited in claim 1 wherein (c) is practiced prior to (b).

9. A method as recited in claim 1 wherein (a) is practiced for 15 seconds–2 minutes.

10. A method as recited in claim 1 wherein the sludge contains harmful matter, including organic fibrils; and further comprising (f) substantially simultaneously with, or prior to, (b) and (c), adding enzyme to the sludge to break down the structures of the harmful matter.

11. A method as recited in claim 1 further comprising, just before (e), adding fibrous auxiliary matter to the sludge to increase the efficiency of water removal.

12. A method as recited in claim 1 further comprising, just before (e), adding a tenside to the sludge to increase the efficiency of water removal.

13. A method as recited in claim 1 further comprising, just before (e), (f) removing free water from the sludge by filtering the sludge.

14. A method as recited in claim 13 further comprising, after (f) and before (e), (g) adding fibrous material to the sludge to increase the efficiency of water removal in (e).

15. A method as recited in claim 14 wherein (e) is accomplished by pressing the sludge at a pressure of 1–60 bar.

16. A method as recited in claim 15 wherein (e) is further practiced in at least two separate stages, a low pressure stage in which water is pressed out from the sludge at a pressure of 1–5 bar, and subsequent to the low pressure stage, a high pressure stage, in which water is pressed out from the sludge at a pressure of 5–60 bar.

17. A method as recited in claim 16 wherein practice of the low pressure stage results in the formation of a sludge cake; and further comprising breaking down the sludge cake prior to practice of the high pressure stage.

18. A method of recovering water from sludge containing dissolved substances, comprising:

(a) treating the sludge with ultrasound; then after (a)

(b) adding coagulant to the sludge to effect coagulation of dissolved substances therein;

(c) prior to or simultaneously with (b), vigorously mixing the sludge to activate water bound to the sludge and to make the coagulant more effective; then after (b) and (c)

(d) flocculating the sludge to form flocs of solid matter; and (e) mechanically removing water from the flocculated sludge.

19. A method as recited in claim 18 further comprising, just before (e), removing free water from the sludge by filtering the sludge.

20. A method as recited in claim 18 further comprising, just before (e), adding fibrous auxiliary matter to the sludge to increase the efficiency of water removal.

* * * * *